Jan. 21, 1941.                N. W. REDMER                2,229,474
                              CAMERA TRIPOD
                            Filed May 31, 1939
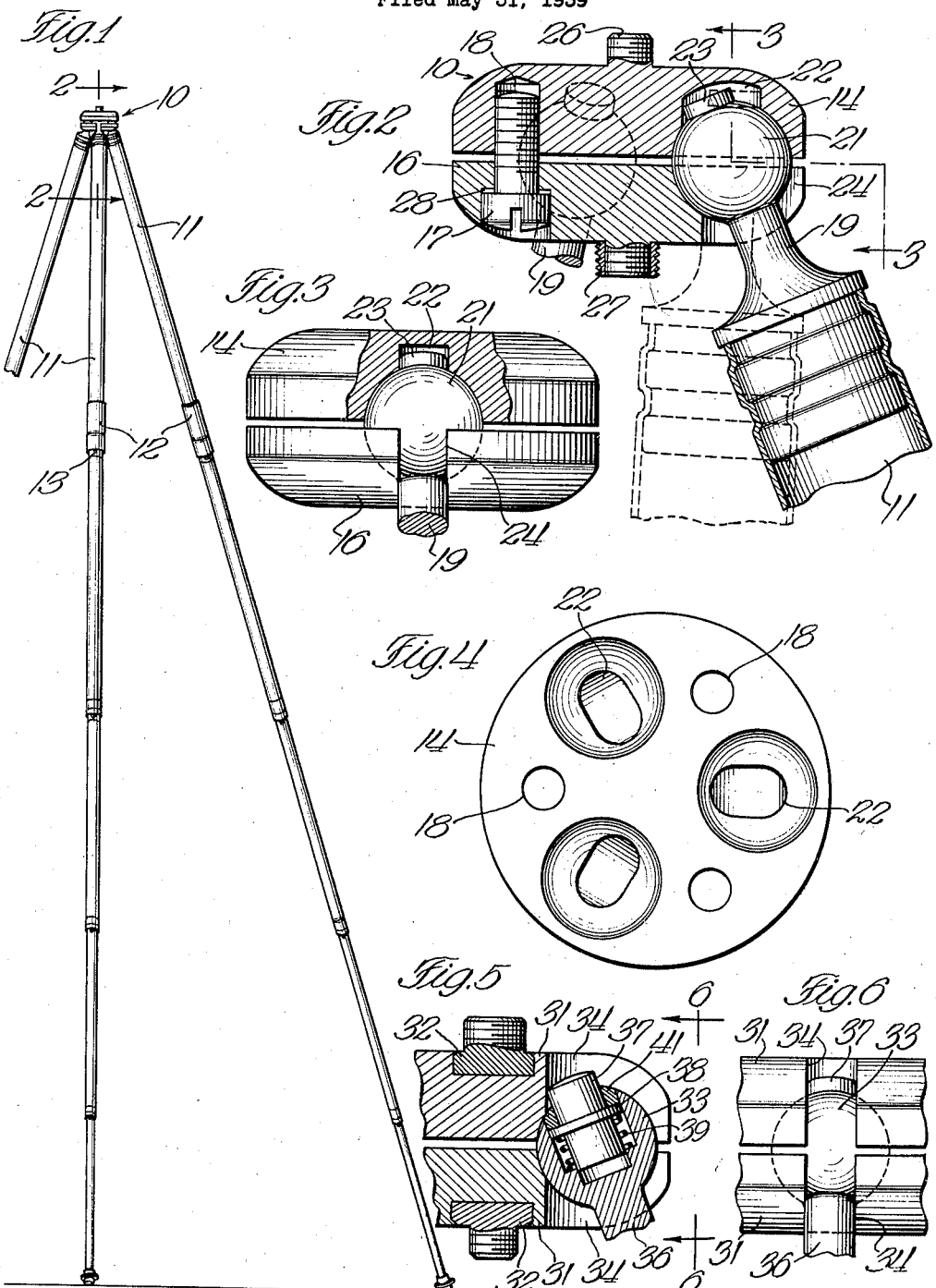

Patented Jan. 21, 1941

2,229,474

UNITED STATES PATENT OFFICE 2,229,474

CAMERA TRIPOD

Norman W. Redmer, Chicago, Ill.

Application May 31, 1939, Serial No. 276,515

4 Claims. (Cl. 248—188)

My invention relates to camera tripods and has for its object the provision of an improved camera tripod, particularly one which is relatively simple and inexpensive to manufacture but which will be strong, durable and convenient in use.

In the drawing,

Fig. 1 is a fragmentary, elevational view showing a tripod made in accordance with my invention;

Fig. 2 is a sectional view taken on the line 2—2 of Fig. 1, looking in the direction of the arrows, some of the parts being shown in dotted position to facilitate an understanding of the operation of the parts;

Fig. 3 is an elevational view, partly in section, such as would be seen by looking along the line 3—3 of Fig. 2;

Fig. 4 is a bottom plan view of one of the parts of the head;

Fig. 5 is a fragmentary sectional view showing a modification; and

Fig. 6 is a fragmentary elevational view such as would be seen by looking along the line 6—6 of Fig. 5.

In constructing the camera tripod of my invention, I utilize a head, indicated generally by the reference character 10, to which telescoping legs 11 are pivoted in such a manner as to limit their movement. The leg portion of the tripod is preferably made in accordance with a feature shown in my co-pending application Serial No. 259,724, filed March 4, 1939, wherein a separate sleeve 12 is provided for depressing the plungers or stops 13 so that it is unnecessary to depress these plungers or stops with the fingers. This feature, however, is fully brought out and claimed in my copending application and need not be explained here in any detail. The present invention concerns itself primarily with the head and the manner in which the legs of the tripod are pivoted to the head.

Looking first at the embodiment detailed in Figs. 2 to 4, inclusive, the head proper comprises an upper member 14 and a lower member 16 secured together by a plurality of cap screws 17, preferably three in number, and disposed radially of the center of the members 14 and 16 and between the positions occupied by the legs. In Fig. 4, the holes 18 are shown, and the position of these holes represents the most desirable positions for the cap screws 17 to occupy. The legs 11 terminate in a member 19 having a ball 21 which is pinched between the two head members. This member 19 is provided with a series of spaced annular projections and depressions so that the uppermost tube comprising the telescoping leg may be formed, as shown in Fig. 2, so that the member 19 and the legs are, for all practical purposes, integral. This construction is inexpensive and strong.

Referring now more particularly to the manner of pivoting the member 19, each of the members 14 and 16 has a generally semi-spherical depression, the depressions facing each other, for accommodating the balls 21. The member 14, however, has a generally oval surface slot 22 into which an integral projection 23 of the ball 21 projects. The lower head member 16 has an edge slot 24 just wide enough to receive the narrowed shank portion of the member 19 immediately below the ball. The width of the slot 22 is only very slightly wider than the diameter of the projection 23, but it is long enough, looking at the radial direction, to permit the legs to be extended outwardly an adequate distance, for example, approximately twenty to thirty degrees from vertical. The exact functioning of this arrangement, however, will be brought out more particularly hereinafter.

The upper head member 14 is provided with a threaded central boss 26 to which a camera may be attached, and the member 16 has a somewhat similar boss to which an adapter 27 is threaded. Almost all cameras are provided with a standard attaching threaded recess, American cameras as a rule having a standard American thread and designed for a relatively smaller attaching screw or thread than the European makes of cameras. Accordingly, I preferably make the boss 26 of a size to receive the American camera without the use of the adapter. The adapter 27 is secured to the lower boss merely for safe keeping, and, if a European camera is to be employed, the adapter is removed and can be threaded onto the boss 26.

In manufacturing the tripod of my invention, the members 14 and 16 are fabricated in a suitable manner, and I have found that suitably strong die castings may be made so that the entire head is substantially finished when it is received from the die casting machine. Preferably, it is given a surface finish, however, such as a chromium finish. The bosses may either be of die cast metal or they may be separately formed and inserted in recesses provided for the purpose. In the drawings, I show them integral, and I have found that in general good results can be secured by this method.

The member 19 may be made very inexpensively on an automatic screw machine, all of the parts being finished smooth and substantially ready for assembly when they are received from the automatic screw machine. The material employed may be selected in accordance with the ideas of the designer, but I have found that a good grade of steel may be used to advantage and a surface finish may be applied to it, as, for example, a chromium coating. In assembling the tripod, the members 19 are first secured to the legs, and the legs are then assembled with the two head members.

The two positions shown in Fig. 2 represent substantially the extremes of movement of the legs. In the full line position, the leg is extended out roughly about thirty degrees so that the tripod may be set in the position shown in Fig. 1. The extension 23 acts as a stop and prevents the legs from spreading, even though by continued use the pivot connections may be relatively loose. When the legs are brought back to the dotted line position, the member 23 acts as a stop so that the three legs will remain substantially parallel to each other and there will be no tendency toward a twisting action. Another feature results from the fact that the extension 23 is only sufficiently smaller than the width of the surface slots 22 to permit free movement and the shank of the member 19 also fits snugly in the slot 24 of the lower head member 16. As a consequence, the pivoting action is confined to a plane parallel to a radius line extending from the center of the head, and there will be no more wobbling than if the legs were secured on a pin type of pivot.

While the legs will continue to behave satisfactorily even though continued use will introduce some play in the pivot joint, those utilizing the tripod may wish at all times to maintain a relatively tight or snug pivot and this can be readily accomplished at any time by merely taking up on the cap screws 17, it being noted that lock washers 28 will function to hold the cap screws to substantially any position to which they are turned, providing, of course, there is some tension on these lock washers.

In the modification of Figs. 5 and 6, I utilize substantially the same improvements explained in connection with the first described embodiment, except that the legs are mounted in such a way that they may be released to swing through an arc of 180 degrees and, as a consequence, the use of a separate adapter is not required. In accordance with this embodiment, I utilize a pair of head members 31 which may be identical. Each is provided with a center recess to which a camera fastening member 32 is secured. These camera fastening members are provided with different threads so as to accommodate either one of the usual two types of cameras encountered. Each of the members 31 has a semi-spherical recess for receiving a ball 33, but in each case the recess is cut through with a radially disposed slot 34 for receiving the shank 36 which is part of a member otherwise identical with the member 19 shown in the first described embodiment. The ball is recessed longitudinally of its axis to receive a plunger 37 having an annular flange 38. It will be noted that the upper part of the recess in the ball 33 is wide enough to receive the flange 38 and the lowermost portion of the recess is just wide enough to receive the main body of the plunger. This provides a shoulder against which a spring 39 engages, the upper part of the spring engaging the lower surface of the flange 38. The spring forces the plunger upwardly to a position where it is stopped by the flange 38 engaging against a ring-shaped retaining member 41. This spring is made relatively stiff so that in normal operation the extending end of the plunger 37 will at all times act as a stop by engaging against the end of the slot 34 and thereby limit the pivoting action so that the legs of the tripod cannot be extended beyond about 30 degrees from the vertical, the exact amount of the extension depending upon the ideas of a designer in a particular case. Moreover, since the extending end of the plunger which acts as a stop is snug in the slot 34, as shown in Fig. 6, and the shank 36 is also snug in the slot 34, the pivoting action will be confined to a plane parallel with the radius of the head members. By extending the plunger 37 slightly down in the lowermost portion of the recess of the ball 33, a two-point support is obviously obtained which will also prevent the plunger from wobbling. If, however, the user of the tripod desires to swing the legs around through an arc of substantially 180 degrees in order to make available another one of the camera supports 32, it is simply necessary to insert any small instrument into the slot 34, depress the plunger to a point where its top surface defines a circle comprising the exterior surface of the ball, and the leg can then be swung entirely around. In the new position, the leg will continue to act in a manner described to limit the outward movement of the legs.

Thus it will be seen that in the embodiment of Figs. 5 and 6, I utilize the same stop features and the same relatively inexpensive but durable construction which are employed in the first described embodiment.

What I claim as new and desire to protect by Letters Patent of the United States is:

1. A camera tripod comprising a plurality of leg members, each having a ball at one end thereof, a two-part head member, the two parts having mating semi-spherical recesses for receiving the said balls carried by the legs, means for clamping said head members together, a projection on each of said balls, each of said projections interfitting with a slot in a wall of each of said recesses for restricting movement of said legs in a single plane and for limiting the extent of the swinging movement between the legs and head member.

2. A camera tripod comprising a head having a pair of head members held together in face to face relation, said members having oppositely lying semi-spherical recesses, together defining a plurality of generally spherical recesses, a plurality of leg members each terminating in a swivel member comprising a narrow shank and a ball carried on the end of the shank clamped between the head members in one of said recesses, one head member having radial slots to pass each of said narrow shanks, and the other having oval surface slots in its semi-spherical recesses, and a longitudinal extension on each of said balls extending into each of said surface slots, said shank and extension holding the associated legs against movement except in a plane parallel to said radial slot, and said surface slots limiting the movement of said legs by limiting the movement of said longitudinal extension therein.

3. A camera tripod comprising a top and a bottom head member, said top head member having a plane face with three radially disposed, generally semi-spherical recesses therein, each of said semi-spherical recesses having an oval slot running generally in a radial direction with respect to said head member, said bottom head member having a plane face provided with complementary semi-spherical recesses corresponding in position to the semi-spherical recesses provided in said top head member, and radial slots cutting through a portion of said semi-spherical recesses, three legs each terminating in a narrow shank, a ball on the shank, and an extension on the ball disposed substantially diametrically opposite said shank, each ball lying between said head members in said recesses, each extension lying in one of said oval slots, and each shank disposed in one of said radial slots, and means for clamping said head members together.

4. A camera tripod comprising two head members, each having a plurality of complementary semispherical recesses partly cut through by radial edge slots, said recesses defining generally spherical recesses when said head members are secured together, a plurality of leg members each having a ball lying in one of said spherical recesses, each ball having a spring pressed plunger extending into one of said radial slots and engaging an end surface thereof to limit the swinging movement of the leg, each of said plungers being depressible to pass said end surface and providing for its associated leg being moved in an arc of 180 degrees, and means for clamping said head members together.

NORMAN W. REDMER.